United States Patent
Yamada et al.

(10) Patent No.: US 10,880,337 B2
(45) Date of Patent: Dec. 29, 2020

(54) SOCIAL NETWORKING SERVICE ANALYSIS APPARATUS, SOCIAL NETWORKING SERVICE ANALYSIS METHOD, AND COMPUTER-READABLE MEDIUM

(71) Applicant: FUJITSU LIMITED, Kawasaki (JP)

(72) Inventors: Koji Yamada, Yokohama (JP);
Toshitaka Satomi, Yamato (JP);
Ryusuke Masuoka, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 149 days.

(21) Appl. No.: 16/190,604

(22) Filed: Nov. 14, 2018

(65) Prior Publication Data

US 2019/0166164 A1 May 30, 2019

(30) Foreign Application Priority Data

Nov. 30, 2017 (JP) ................. 2017-230888

(51) Int. Cl.
| | |
|---|---|
| *H04L 29/06* | (2006.01) |
| *G06F 11/00* | (2006.01) |
| *G06F 16/25* | (2019.01) |
| *H04W 4/021* | (2018.01) |
| *G06F 21/00* | (2013.01) |

(52) U.S. Cl.
CPC .......... *H04L 63/302* (2013.01); *G06F 11/008* (2013.01); *G06F 16/258* (2019.01); *G06F 21/00* (2013.01); *H04L 63/145* (2013.01); *H04L 63/1425* (2013.01); *H04L 63/1441* (2013.01); *H04W 4/021* (2013.01)

(58) Field of Classification Search
None
See application file for complete search history.

(56) References Cited

U.S. PATENT DOCUMENTS

2007/0226796 A1* 9/2007 Gilbert ................ H04L 63/1425 726/22
2009/0282476 A1* 11/2009 Nachenberg .......... G06F 21/577 726/22

(Continued)

FOREIGN PATENT DOCUMENTS

| JP | 2009-110334 | 5/2009 |
| JP | 2011-192103 | 9/2011 |

OTHER PUBLICATIONS

Noel et al., (Big-Data Architecture for Cyber Attack Graphs—Representing Security Relationships in NoSQL Graph Databases) (Year: 2014).*

*Primary Examiner* — William J. Goodchild
(74) *Attorney, Agent, or Firm* — Fujitsu Patent Center

(57) ABSTRACT

A cyber attack information processing apparatus includes one or more memories, and one or more processors coupled to the one or more memories and the one or more processors configured to, when acquiring information regarding a first cyber attack, store the information in the one or more memories in association with reliability based on an acquisition source of the information, and when detecting that posted information related to the information is uploaded from a terminal, perform update of the reliability associated with the information in accordance with first reliability of the posted information.

13 Claims, 18 Drawing Sheets

(56) References Cited

U.S. PATENT DOCUMENTS

| | | | |
|---|---|---|---|
| 2015/0172321 A1* | 6/2015 | Kirti | H04L 63/1416 726/1 |
| 2015/0242637 A1* | 8/2015 | Tonn | H04L 63/1433 726/25 |
| 2016/0359872 A1* | 12/2016 | Yadav | H04L 43/0894 |

* cited by examiner (STIX 2.1 Confidence Mappings)

```
...
<!-- cyber attack campaign -->
<stix:Campaigns>
<stix:Campaign xsi:type="campaign:CampaignType" id="IPA:campaign_example">
<campaign:Title>title of cyber attack campaign</campaign:Title>
<campaign:Description>description of cyber attack campaign</campaign:Description>
<campaign:Short_Description>summary of cyber attack campaign</campaign:Short_Description>
<campaign:Names>
<campaign:Name>name of cyber attack campaign</campaign:Name>
</campaign:Names>
<!-- intention of attack campaign -->
<campaign:Intended_Effect>
<stixCommon:Value xsi:type="stixVocabs:IntendedEffectVocab-1.0">Unauthorized Access</stixCommon:Value>
</campaign:Intended_Effect>
<!-- status of attack campaign -->
<campaign:Status xsi:type="stixVocabs:CampaignStatusVocab-1.0">Historic</campaign:Status>
<!-- TTPs of attack campaign -->
<campaign:Related_TTPs>
<campaign:Related_TTP>
<stixCommon:TTP idref="IPA:ttp_example"/>
</campaign:Related_TTP>
</campaign:Related_TTPs>
<!-- incident related to attack campaign -->
<campaign:Related_Incidents>
<campaign:Related_Incident>
<stixCommon:Incident idref="IPA:incident_example"/>
</campaign:Related_Incident>
</campaign:Related_Incidents>
...
```

FIG. 8

| POST | POSTING USER (USER RELIABILITY) | CONFIDENCE | FEEDBACK | CORRECTED RELIABILITY |
|---|---|---|---|---|
| P1 | YAMADA (10) | High (+2) | SATO +1 | +13 |
| P2 | YAMADA (10) | Low (-2) | SATO -1 | +7 |
| P3 | SUZUKI (13) | None (x(-1)) | YAMADA +1, SATO +1 | -(13+1+1) =-15 |
| ⋮ | ⋮ | ⋮ | ⋮ | ⋮ |

FIG. 13
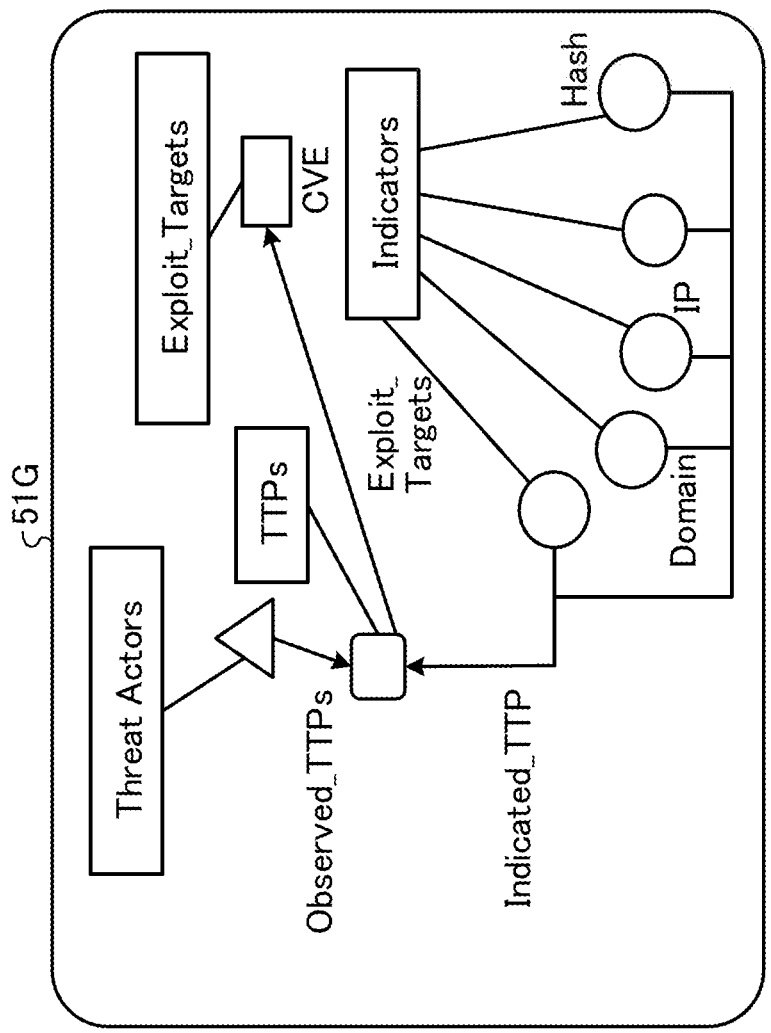
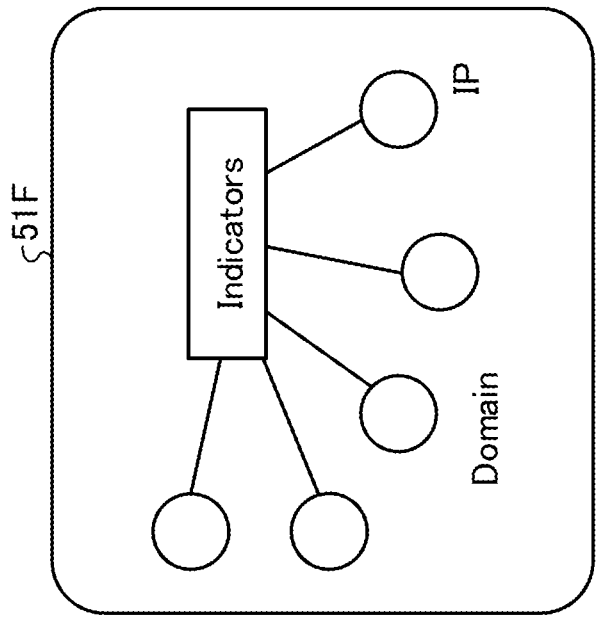

FIG. 14

| CTI | CTI INFORMATION SOURCE | BASIC RELIABILITY (INFORMATION SOURCE RELIABILITY) | POSTED INFORMATION | CORRECTED RELIABILITY | INFORMATION SOURCE RELIABILITY (UPDATED) |
|---|---|---|---|---|---|
| Campaign A | Alien Vault | 10 | POST P1 +(YAMADA 12, SATO 1) | 10+13=23 | $10+13w_A$ |
| Campaign B | iSIGHTPartners | 20 | POST P3 −(SUZUKI 13, YAMADA 1, SATO 1) | 20−15=5 | $20-15w_i$ |
| Campaign C | AIS | 30 | 0 | 30 | 30 |
| ... | ... | ... | ... | ... | ... |

US 10,880,337 B2

SOCIAL NETWORKING SERVICE ANALYSIS APPARATUS, SOCIAL NETWORKING SERVICE ANALYSIS METHOD, AND COMPUTER-READABLE MEDIUM

CROSS-REFERENCE TO RELATED APPLICATION

This application is based upon and claims the benefit of priority of the prior Japanese Patent Application No. 2017-230888, filed on Nov. 30, 2017, the entire contents of which are incorporated herein by reference.

FIELD

The embodiments discussed herein are related to a cyber attack information processing technology.

BACKGROUND

Recently, cyber attacks including an unauthorized access via a network are serious concerns. The cyber attacks are made in a variety of methods. To counter the cyber attacks, finding and referencing cyber threat intelligence (also referred to as CTI) related to similar cyber attacks are effective.

The cyber threat intelligence is not only an alert automatically issued by a sensor or the like for a threat actor, a purpose, an attack method, and UP, which stands for a tactic, a technique, and a procedure, related to a cyber attack, but also information on the cyber attack organized in the form of a report containing analysis by an analyst. The standardization of the cyber threat intelligence and the formation of the platform for the cyber threat intelligence are currently in progress, and the infrastructure for using a large amount of cyber threat intelligence is being constructed.

Moreover, a targeted attack targeting a group such as a specific type of industry recently increases. To counter such an attack, a community is formed every group. Each community shares information on cyber threat intelligence using posted information of, for example, a social networking service (SNS). There is known an evaluation apparatus that causes the reliability of a user who has evaluated a target to be associated with the evaluation assigned by another person to the same target later, for posted information in such a community.

For example, Japanese Laid-open Patent Publication No. 2011-192103 and Japanese Laid-open Patent Publication No. 2009-110334 disclose related art.

SUMMARY

According to an aspect of the embodiments, a cyber attack information processing apparatus includes one or more memories, and one or more processors coupled to the one or more memories and the one or more processors configured to, when acquiring information regarding a first cyber attack, store the information in the one or more memories in association with reliability based on an acquisition source of the information, and when detecting that posted information related to the information is uploaded from a terminal, perform update of the reliability associated with the information in accordance with first reliability of the posted information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates an example of CTI;
FIG. 8 is an explanatory view explaining assignment of reliability to a post;
FIG. 13 is an explanatory view explaining a difference in weighting per CTI;
FIG. 14 is an explanatory view explaining assignment of reliability to CTI and an information source.

DESCRIPTION OF EMBODIMENTS

Figure 1:
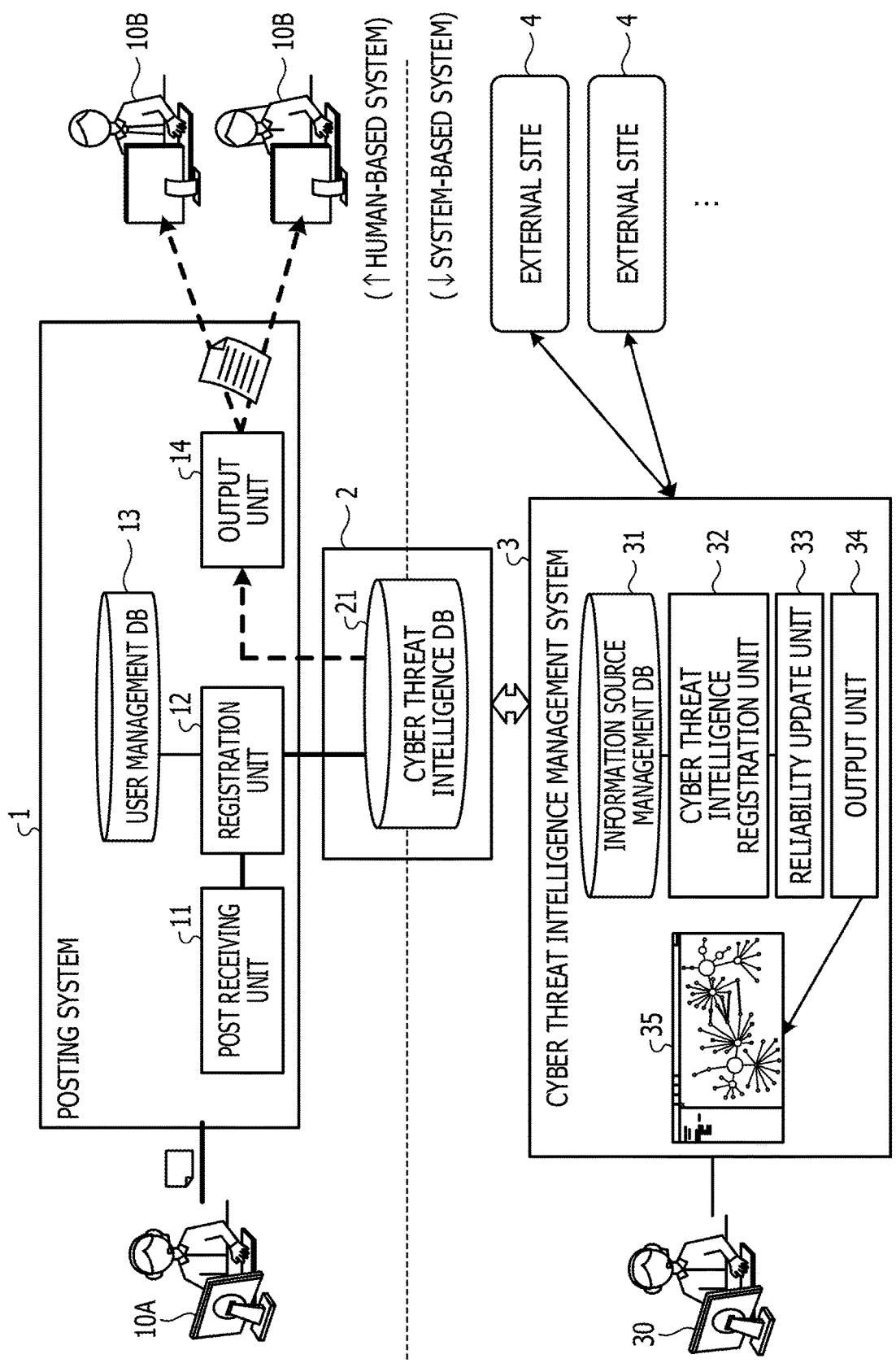
FIG. 1 is an explanatory view explaining an example of a system configuration according to an embodiment.

In related art, the reliability of posted information in SNS is not reflected on related cyber threat intelligence and is not shared. For example, in related art, even though an evaluation related to cyber threat intelligence is made by a post in SNS, the evaluation does not affect the reliability of the cyber threat intelligence. Thus, it has been difficult to increase the efficiency and level of analysis by using the evaluation of the post when cyber threat intelligence is analyzed.

Referring to the drawings, a cyber attack information processing program, a cyber attack information processing method, and an information processing apparatus according to an embodiment are described below. In the description of the embodiment, elements identical in functionality are designated with the same reference numerals and the description, once made, is not repeated. The cyber attack information processing program, the cyber attack information processing method, and the information processing apparatus described in the following embodiment are described for exemplary purposes only, and the disclosure is not limited to the embodiment. The embodiments described below may be properly combined in a consistent way.

FIG. 1 is an explanatory view explaining an example of a system configuration according to an embodiment. As illustrated in FIG. 1, the system configuration according to the embodiment includes a posting system 1, a storage device 2 that stores a cyber threat intelligence database (DB) 21, and a cyber threat intelligence management system 3.

The posting system 1 is, for example, SNS or the like, and is an example of a human-based system that distributes information posted by a user terminal 10A to another user terminal 10B. The user terminals 10A and 10B are each an example of an information processing terminal, and may be, for example, a personal computer (PC), a smart phone, or a tablet terminal.

The posting system 1 includes a post receiving unit 11 that receives information posted by the user terminal 10A, a registration unit 12 that registers the posted information on the cyber threat intelligence DB 21, a user management DB 13 that manages information on a user (poster) basis, and an output unit 14 that outputs the information registered in the cyber threat intelligence DB 21 to the user terminal 10B.

The storage device 2 stores the cyber threat intelligence DB 21 and is connected to the posting system 1 and the cyber threat intelligence management system 3 via a communication network (not illustrated), such as a local area network (LAN) and the Internet.

In this embodiment, an example configuration is provided in which the storage device 2 is separate from the cyber threat intelligence management system 3. Alternatively, the storage device 2 may be built in the cyber threat intelligence management system 3. For example, the cyber threat intelligence DB 21 may be stored in the cyber threat intelligence management system 3.

The cyber threat intelligence DB 21 is a database that stores the cyber threat intelligence (CTI) on each event of cyber attack. The cyber threat intelligence stored in the cyber threat intelligence DB 21 is described in a predetermined data structure, such as a Structured Threat Information eXpression (STIX) language. The STIX language is technical specifications that describe an item related to a cyber attack campaign including a phenomenon characteristic of a cyber attack. In the description that follows, the cyber threat intelligence has a data structure in the STIX format, but the data structure is not limited to the STIX format.

For example, the cyber threat intelligence includes cyber attack campaigns; and event contents of each of threat actors, TTPs, indicators, observables, incidents, courses of action, and exploits targets (also expressed as Campaigns, Threat_Actors, TTPs, Indicators, Observables, Incidents, Courses_Of_Action, and Exploit_Targets). Note that TTP stands for tactics, techniques, and procedures. The event contents included together with the cyber attack campaigns may be information of some or all of the threat actors, TTPs, indicators, observables, incidents, courses of action, and exploit targets.

Figure 2:
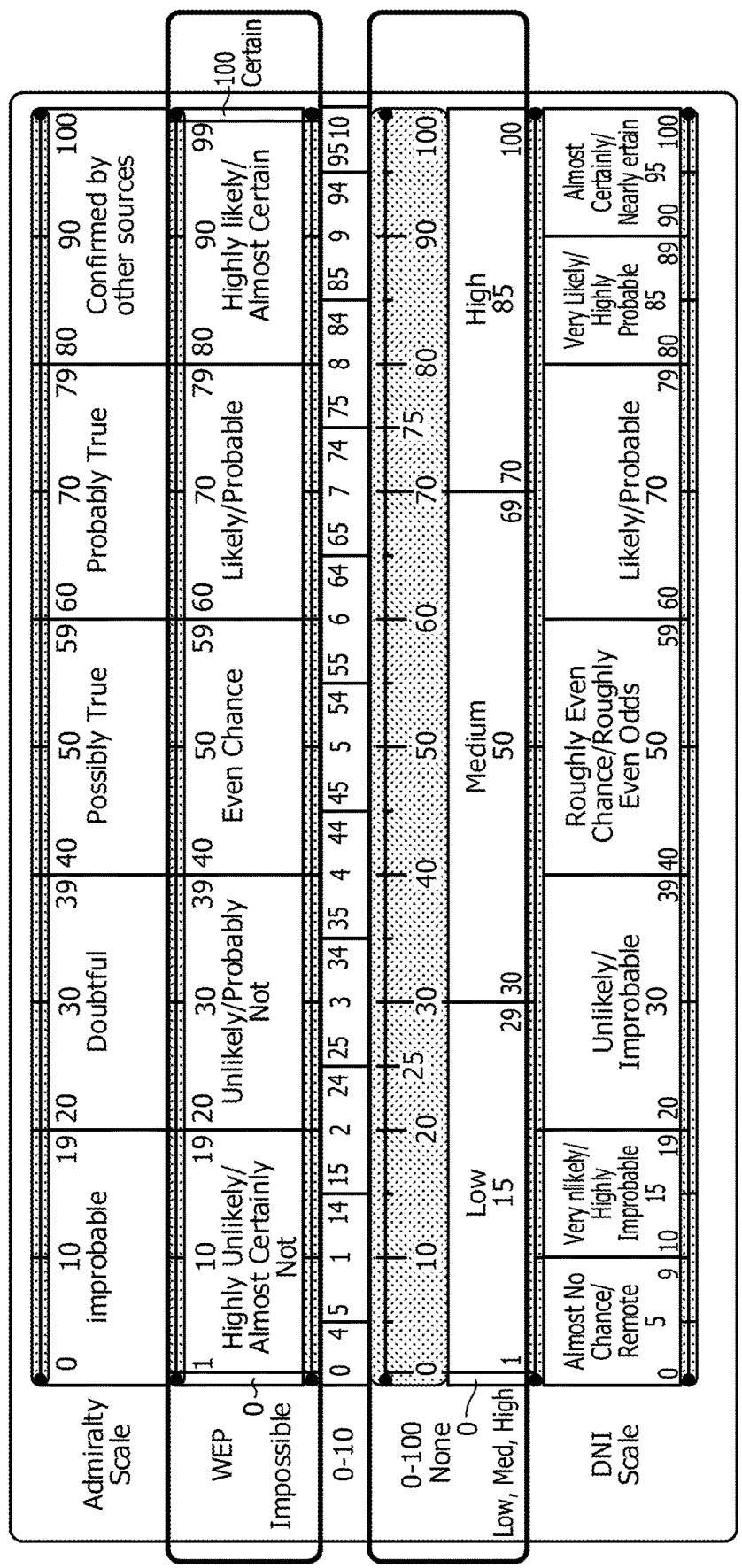
FIG. 2 is an explanatory view explaining an application example of confidence on STIX.

In addition, the cyber threat intelligence includes confidence indicating reliability of the described event contents. FIG. 2 is an explanatory view explaining an application example of confidence on STIX.

As illustrated in FIG. 2, on STIX 2.1, Confidence is applied. For example, STIX 2.1 indicates reliability of the event contents with values from 0 to 100. Note that reliability may be indicated by, for example, four levels of None, Low, Medium, and High in the ascending order.

The cyber threat intelligence includes information indicating an access range indicated by a traffic light protocol (TLP) or the like. For example, the access range is indicated by RED for a receiver of the cyber threat intelligence and AMBER for a receiver and a particular person. The access range is also indicated by GREEN for within a predetermined community (group), and WHITE for the whole world (anybody). A person serving as an access target and a shared group are notified separately from TLP. In this way, the cyber threat intelligence management system 3 provides the cyber threat intelligence to a target indicated by the access range (such as a receiver or group).

FIG. 3 illustrates an example of CTI. As illustrated in FIG. 3, in cyber threat intelligence 21A, tagged elements are layered (in a nested structure) using the eXtensible Markup Language (XML), and thus form the above-described information in a tree structure from a root element. For example, the cyber threat intelligence 21A has elements (nodes) including a cyber attack campaign, a threat actor, TTP, an indicator, an observable, an incident, a course of action, and an exploit target as elements (nodes), and information in each element serves as child element (child node).

The cyber threat intelligence management system 3 is an example of a system-based system that registers in the cyber threat intelligence DB 21 the cyber threat intelligence 21A acquired from an external site 4, and manages and uses the cyber threat intelligence 21A.

In the United States Department of Homeland Security (DHS), the cyber threat intelligence management system 3 is connected via the Internet or the like to an external site 4, such as of automated indicator sharing (AIS) that is a mechanism sharing the cyber threat intelligence 21A or iSIGHT partners or the like that provide a distribution service of the cyber threat intelligence 21A. The cyber threat intelligence management system 3 registers in the cyber threat intelligence DB 21 the cyber threat intelligence 21A provided by the external site 4 using Trusted Automated exchange of Indicator Information (TAXII) or the like.

The cyber threat intelligence management system 3 registers in the cyber threat intelligence DB 21 the cyber threat intelligence 21A input by, for example, an analyst analyzing a cyber attack using a user terminal 30. The cyber threat intelligence management system 3 also provides to the external site 4 the cyber threat intelligence 21A using TAXII or the like. In the system-based system in this way, the cyber threat intelligence management system 3 and the external site 4 share the cyber threat intelligence 21A.

The cyber threat intelligence management system 3 performs syntax analysis on the cyber threat intelligence 21A stored in the cyber threat intelligence DB 21, and acquires information on a type of each of the cyber attack campaign, threat actor, TTP, indicator, observable, incident, course of action, and exploit target. The cyber threat intelligence management system 3 then performs analysis, such as collecting acquired information on the cyber attack, and generates an information source management DB 31 of the analysis results and causes the user terminal 30 to display the information source management DB 31. An analyst or the like using the user terminal 30 may verify the analysis results of the cyber threat intelligence 21A stored in the cyber threat intelligence DB 21.

In accordance with the syntax analysis results of the cyber threat intelligence 21A, the cyber threat intelligence management system 3 sets the cyber attack campaign, threat actor, UP, indicator, observable, incident, course of action, and exploit target in the cyber attack event to be representative nodes, and analyzes the tree structure having information in each node as child nodes. For example, the cyber threat intelligence management system 3 analyzes the tree structure by analyzing the nested structure of the tagged elements (nodes). Based on the analysis results of the tree structure, the cyber threat intelligence management system 3 then generates display information for displaying a display screen 35 in the form of a graph in which the nodes are linked in accordance with the tree structure. The cyber threat intelligence management system 3 then outputs the display screen 35 to the user terminal 30.

The post receiving unit 11, the registration unit 12, the user management DB 13, and the output unit 14 in the posting system 1 are described below in detail.

The post receiving unit 11 receives posted information to be posted in SNS or the like by displaying a post screen on the user terminal 10A via a communication network, such as the Internet. The post receiving unit 11 outputs the posted information received from the user terminal 10A to the registration unit 12.

The registration unit 12 assigns identification information such as ID, and time information indicating time and date of the post to the posted information received by the post receiving unit 11, and registers the resulting information in the cyber threat intelligence DB 21.

For example, the registration unit 12 analyzes a title, a body, and so forth contained in the posted information, and determines whether the posted information contains information on a cyber attack, based on whether a word or a phrase related to the cyber attack is contained in the title, the body, and so forth If the information on the cyber attack is not contained, the registration unit 12 extracts the title of the posted information as an element of "STIX Header Title" in STIX. The registration unit 12 also extracts the body and an attached file of the posted information as an element of "STIX Header Description" in STIX. Based on the extracted elements, the registration unit 12 generates the cyber threat intelligence 21A described in a predetermined data structure, such as STIX, and performs registration processing of registering the cyber threat intelligence 21A in the cyber threat intelligence DB 21.

If the information on the cyber attack is contained, the registration unit 12 extracts, from the posted information, elements in the cyber attack event, such as the cyber attack campaign, threat actor, TTP, indicator, observable, incident, course of action, and exploit target. Based on the extracted elements, the registration unit 12 generates the cyber threat intelligence 21A described in a predetermined data structure, such as STIX, and performs registration processing of registering the cyber threat intelligence 21A in the cyber threat intelligence DB 21.

In the registration processing, the registration unit 12 references the user management DB 13, assigns the reliability set in accordance with the poster (user) of the posted information as the reliability of the cyber threat intelligence 21A, and then registers the cyber threat intelligence 21A.

For example, the user management DB 13 has previously set therein basic reliability of the poster as one of attributes of the poster, together with the identification information (for example, poster ID) for identifying the poster.

The registration unit 12 reads the previously set basic reliability of the poster, together with the poster ID in the posted information. Then, the registration unit 12 sets a value of reliability obtained by adding confidence for the posted contents of the poster contained in the posted information to the read basic reliability, as the reliability of the cyber threat intelligence 21A, and then registers the cyber threat intelligence 21A in the cyber threat intelligence DB 21.

When the posted information to be registered is a feedback (evaluation information) such as agreement or disagreement for another posted information (cyber threat intelligence) that has been registered in the cyber threat intelligence DB 21, the registration unit 12 updates the reliability of the other posted information based on the contents of the feedback. For example, an agreement (positive) feedback may be transmission of "like" while specifying the other posted information with the title or ID thereof. In contrast, a disagreement (negative) feedback may be transmission of a will opposite to "like" while specifying the other posted information with the title or ID thereof.

The registration unit 12 specifies posted information specified with the title, ID, or the like, thereof from among posted information (cyber threat intelligence) registered in the cyber threat intelligence DB 21 to make a feedback to the other posted information. Then, in case of agreement, the registration unit 12 adds a predetermined value to the reliability of the specified posted information and hence updates the reliability. In contrast, in case of disagreement, the registration unit 12 subtracts a predetermined value and hence updates the reliability.

Figure 4:
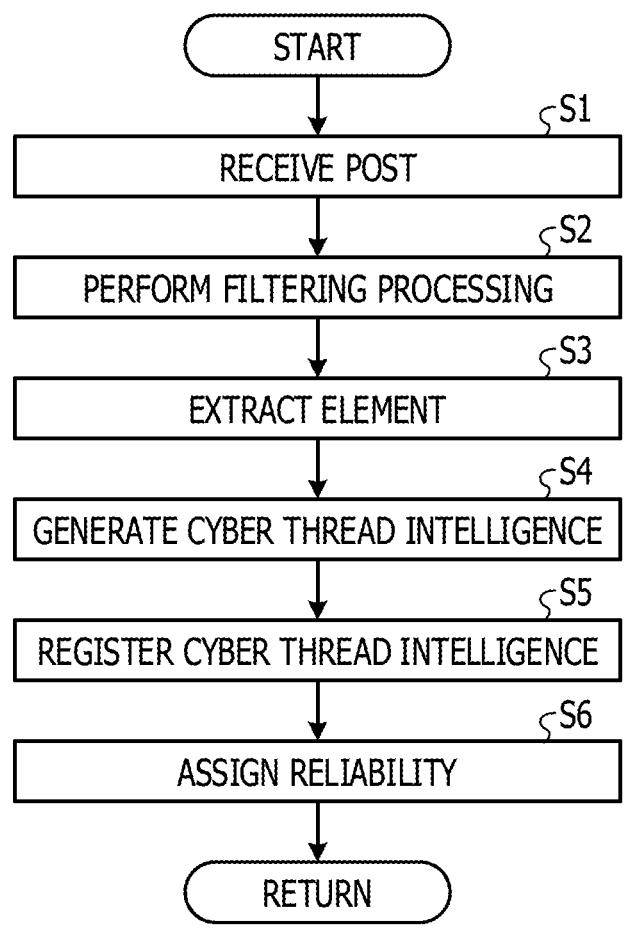
FIG. 4 is a flowchart illustrating an example of registration processing of posted information.

FIG. 4 is a flowchart illustrating an example of the registration processing of the posted information. As illustrated in FIG. 4, when the registration processing starts, the post receiving unit 11 receives the posted information from the user terminal 10A (S1).

Figure 5:
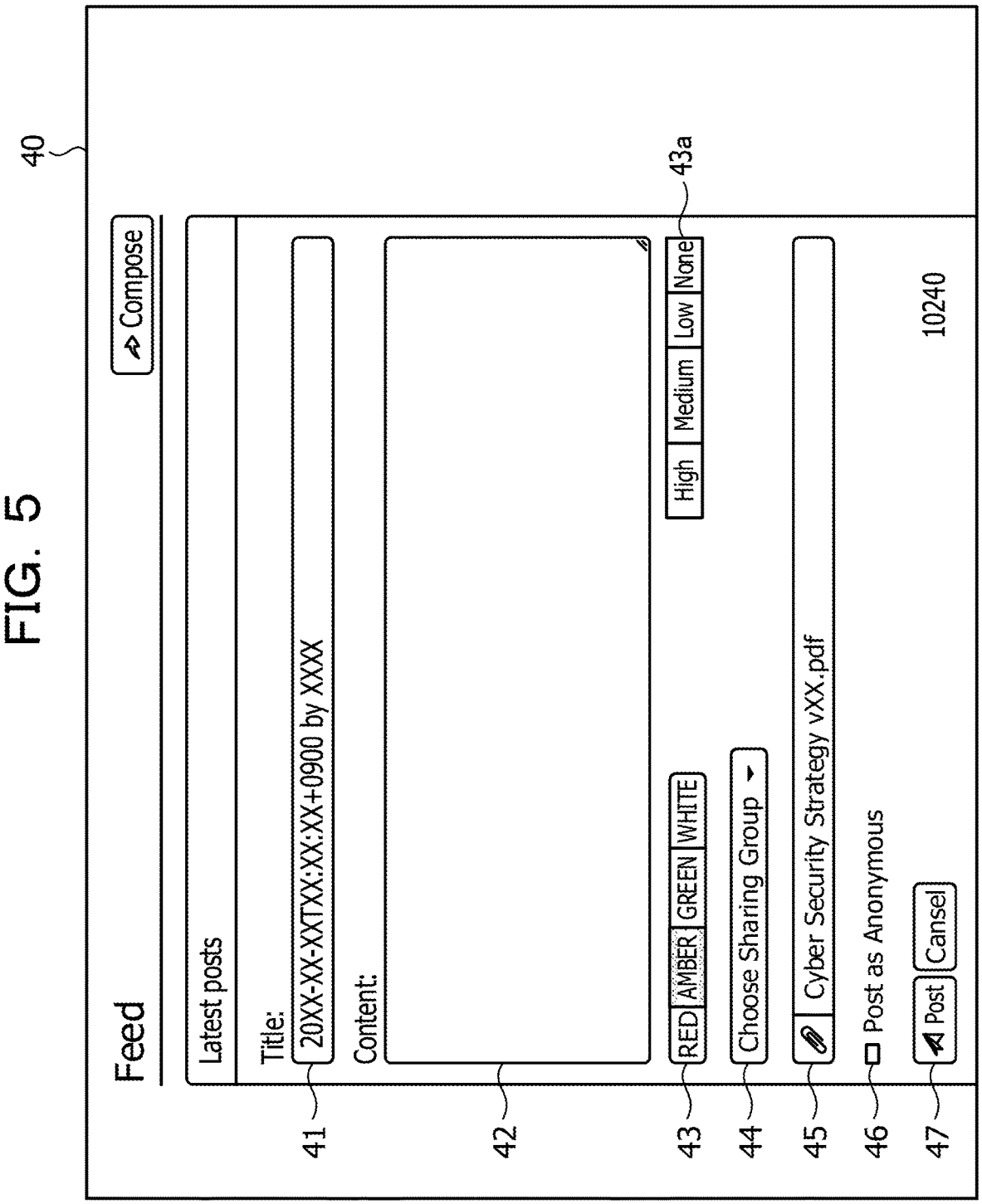
FIG. 5 is an explanatory view explaining an example of a post screen.

FIG. 5 is an explanatory view explaining an example of a post screen. As illustrated in FIG. 5, with the user terminal 10A, posted information is input through a post screen 40 indicating input items 41 through 46, and a post button 47.

For example, the item 41 indicates a title of the posted information. The item 42 indicates a body of the posted information. The item 43 indicates an access range of the posted information. For example, the item 43 indicates the access ranges indicated by TLP, such as RED, AMBER, GREEN, WHITE, and so forth.

An item 43a indicates confidence in the posted contents of the poster. For example, in the illustrated example, setting is selected from "High", "Medium", and "Low" in the descending order of confidence. Note that "None" is used to represent that the posted contents are wrong.

Alternatively, the item 43a may indicate a feedback to the other post specified with the title or the like thereof. For example, in case of agreement with the other post specified with the title or the like thereof (for example, transmission of "like"), a feedback is made with "High", "Medium", or "Low" for the degree of agreement. In contrast, in case of disagreement with the other post specified with the title or the like thereof (for example, transmission of will opposite to "like"), a feedback is made with "High", "Medium", or "Low" for the degree of disagreement, together with "None".

The item 44 indicates a group or a person sharing the posted information in the access range indicated by TLP. The item 45 specifies a file that is to be attached to the posted information. Note that while a single file is attached in the item 45 in the displayed example, multiple files may be specified in the item 45. The item 46 specifies whether the poster of the posted information is to be anonymous.

The user of the user terminal 10A sets each of the items 41 through 46, operates the post button 47, and thus transmits the posted information having the contents set in the items 41 through 46 to the posting system 1. The registration unit 12 assigns information, such as ID and posting date and time, and then registers the posted information having the contents set in the items 41 through 46 in the cyber threat intelligence DB 21.

Referring back to FIG. 4, subsequently to S1, the registration unit 12 performs filtering processing of acquiring a word or a phrase related to a cyber attack in the title and the body contained the posted information (S2). With the filtering processing, the registration unit 12 screens the posted information useful in the conversion into the cyber threat intelligence 21A.

The registration unit 12 analyzes the filtered posted information, specifically, analyzes the posted information related to the cyber attack, and extracts a variety of elements and an access range related to the cyber attack event to be used to describe the cyber threat intelligence 21A (S3).

For example, the registration unit 12 extracts the title of the posted information as an element of "STIX Header Title" in STIX. The registration unit 12 also extracts the body of the posted information as an element of "STIX Header Description" in STIX.

The registration unit 12 extracts, from the title and the body of the posted information, elements such as the threat actor, UP, and indicator, by using regular expressions or natural language processing of related art, and sets the elements in STIX. The registration unit 12 also extracts a value indicated by TLP, such as RED, AMBER, GREEN, WHITE, or the like, from the item of the access range in the posted information. The registration unit 12 also extracts a value indicated with "High", "Medium", "Low", or "None" from the item indicating confidence.

If a simple markup indicating an STIX element is entered in the title or the body at posting, the STIX element may be extracted based on the markup. For example, if a sentence reading "Country X is mounting a cyber attack . . . " is expressed as follows: "<Threat_Actor: Country X> is mounting a cyber attack", "Country X" is the threat actor of STIX.

If the contents indicating another post exist in the title, body, and the like, at posting (title or ID of the other post), the contents are extracted as a feedback to the other post.

The registration unit 12 extracts the STIX elements of the file attached to the posted information (CSV file, text file, or the like) by using regular expressions or natural language processing of related art. For example, the registration unit 12 extracts an IP address, a domain, a name, a hash value, and so forth, in the indicators, based on an address list described in a CSV file or the like. The registration unit 12 uses the extracted values as both or one of STIX indicators and STIX observables. Based on a document, such as a text file, the registration unit 12 extracts the elements, such as the threat actor, TTP, and Indicator, and sets them to be the STIX elements. As for the attached file, the registration unit 12 may extract an STIX element, based on the markup.

The registration unit 12 generates the cyber threat intelligence 21A by tagging the elements extracted in S3 in accordance with STIX (S4), and registers the generated cyber threat intelligence 21A in the cyber threat intelligence DB 21 (S5).

Figure 6:
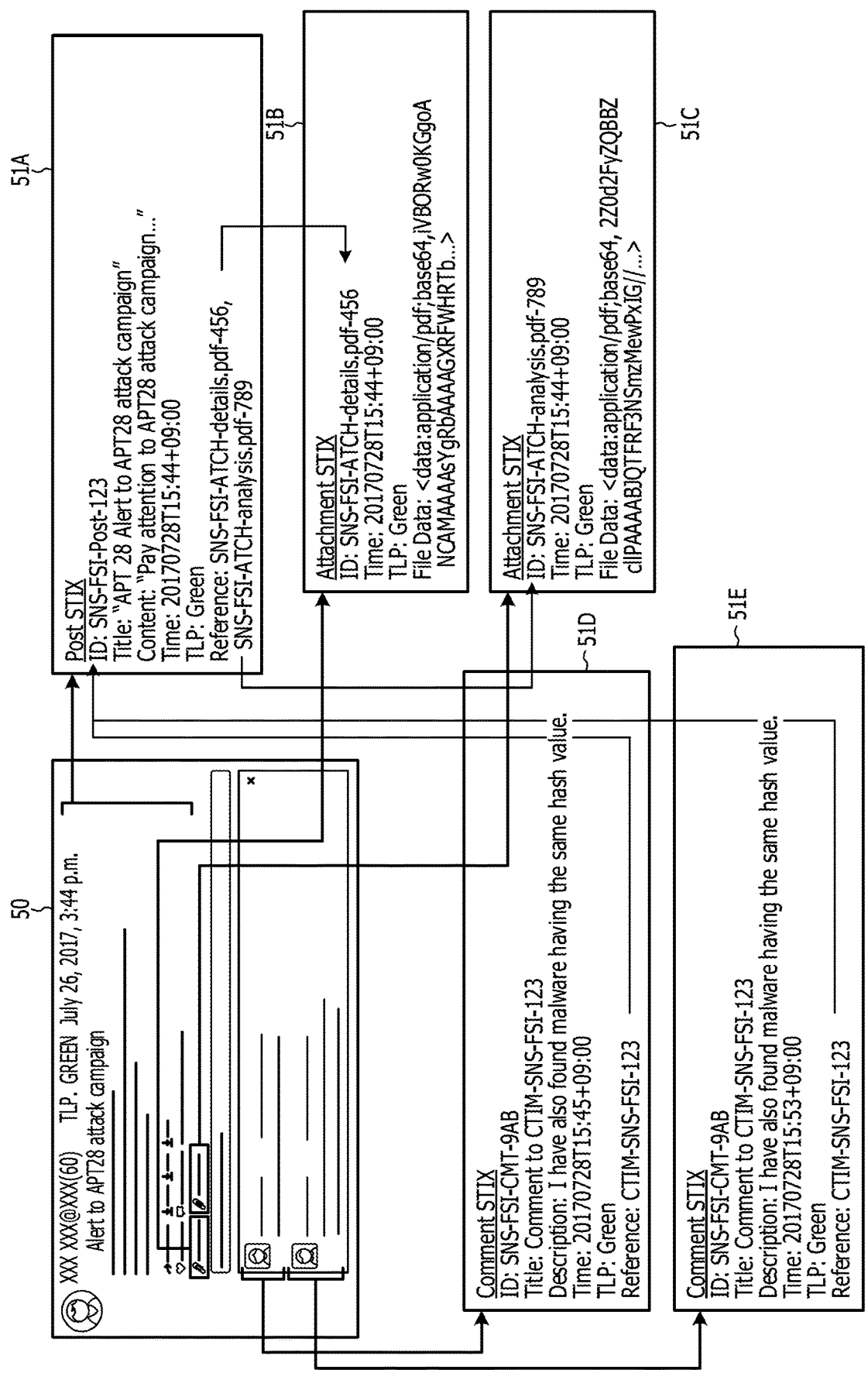
FIG. 6 is an explanatory view explaining conversion from posted information into CTI.

FIG. 6 is an explanatory view explaining conversion from posted information into cyber threat intelligence. As illustrated in FIG. 6, the title and the body of posted information 50 are converted into cyber threat intelligence 51A by extracting a variety of elements related to a cyber attack event. Similarly, a file attached to the posted information 50 is converted into cyber threat intelligence 51B and 51C. Alternatively, an attached file may be contained as an STIX element after being encoded in accordance with a predetermined encoding method, such as Base64. Likewise, comments related to the posted information 50 are converted into cyber threat intelligence 51D and 51E.

The conversion into the cyber threat intelligence 51A through 51E is performed with the access range specified by the posted information 50 maintained the same. For this reason, the access range specified by the posted information 50 remains still unchanged in the cyber threat intelligence 51A through 51E.

Each piece of the cyber threat intelligence 51A through 51E converted from the posted information 50 is assigned with respective IDs, and "IDs" of reference destinations to be mutually referenced are described in "Reference". Thus, the relationship of the cyber threat intelligence 51A through 51E is specified.

Referring back to FIG. 4, subsequently to S5, the registration unit 12 performs processing of assigning reliability to a post (cyber threat intelligence 21A) to be registered in the cyber threat intelligence DB 21 (S6).

Figure 7:
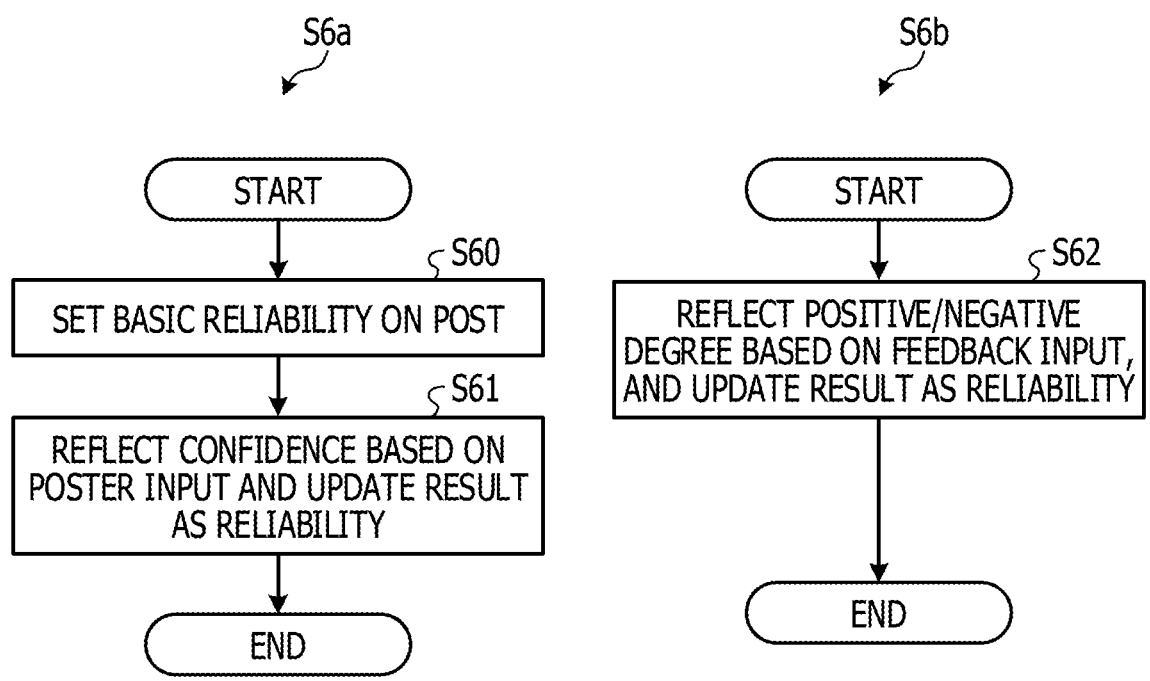
FIG. 7 provides flowcharts illustrating processing of assigning reliability to a post.

FIG. 7 provides flowcharts illustrating processing of assigning reliability to a post. For example, S6a in FIG. 7 is a flowchart illustrating processing of assigning reliability to cyber threat intelligence 21A at new posting. S6b in FIG. 7 is a flowchart illustrating processing of assigning reliability at feedback to another posted information (cyber threat intelligence) that has been registered in the cyber threat intelligence DB 21.

As illustrated in the flowchart S6a, the registration unit 12 sets basic reliability that has been read from the user management DB 13 based on the poster ID, for a new post (cyber threat intelligence 21A) at new posting (S60). Then, the registration unit 12 adds confidence based on poster's input (item 43a) to the basic reliability, and updates (registers) the resulting reliability, as the reliability of the cyber threat intelligence 21A (S61).

For example, the registration unit 12 calculates reliability (R)=Rb (basic reliability)+f(C: confidence), and sets the calculated reliability to the reliability of the cyber threat intelligence 21A. Note that f(C) is a function corresponding to confidence (C). For example, f(C) is "2" when C is "High", f(C) is "1" when C is "Medium", f(C) is "0" when C is "Low", and f(C) is "(x-1)" when C is "None".

As illustrated in the flowchart S6b, the registration unit 12 specifies another post (cyber threat intelligence) for feedback, by using the title and ID at feedback. Then, the registration unit 12 reflects a value corresponding to the positive/negative degree based on the feedback input, on the reliability of the other specified post, and updates the reliability (S62).

For example, the registration unit 12 obtains an updated reliability (Rnew) with an expression Rnew=R+f(F0) using an original reliability (R) and a function f(F0) determined based on a feedback content (F0). For example, f(F0) is a function obtained as a higher value as the positive degree is higher, and is obtained as a lower value as the negative degree is higher.

In this way, the posted information (containing information on the cyber attack) received by the posting system 1 from the user terminal 10A is shared as the cyber threat intelligence 21A in the cyber threat intelligence DB 21 with the cyber threat intelligence management system 3. The cyber threat intelligence 21A of the posted information is assigned with the reliability that is calculated based on one or a combination of the reliability set on the poster (post source), the confidence assigned by the poster, and the feedback made by another poster on the posted information.

FIG. 8 is an explanatory view explaining assignment of reliability to a post. As illustrated in FIG. 8, regarding a post (P1), the user reliability set on Yamada who is a poster is "10", and the confidence assigned by the poster is "High (+2)". Sato made a positive feedback "+1" on the post (P1). To cyber threat intelligence 21A of such a post (P1), corrected reliability of 10+2+1=13 is assigned.

Regarding a post (P2), the user reliability set on Yamada who is the poster is "10", and the confidence assigned by the poster is "Low (−2)". Sato made a negative feedback "−1" on the post (P2). To cyber threat intelligence 21A of such a post (P2), corrected reliability of 10−2−1=7 is assigned.

Regarding a post (P3), the user reliability set on Suzuki who is a poster is "13", and the confidence assigned by the poster is "None (x(−1))". Sato and Yamada made positive feedbacks "+1" on the post (P3). To cyber threat intelligence 21A of such a post (P3), corrected reliability of −(13+1+1) =−15 is assigned.

Referring back to FIG. 1, in response to an access from the user terminal 10B (such as a user ID identifying a user and a reference request of the posted information 50), the output unit 14 reads information registered in the cyber threat intelligence DB 21, and outputs the information to the user terminal 10B. For example, in response to the access from the user terminal 10B, the output unit 14 reads information falling within the access range of the posted information 50 from the cyber threat intelligence DB 21 in accordance with the user ID or the like notified by the user terminal 10B. Then, the output unit 14 further generates display data that indicates the posted information 50 read from the cyber threat intelligence DB 21, and outputs the display data to the user terminal 10B. In this way, the posted information 50 falling within the access range of the user of the user terminal 10B is thus displayed on the user terminal 10B.

The output unit 14 references the cyber threat intelligence DB 21 to monitor whether the cyber threat intelligence management system 3 has added new cyber threat intelligence 21A. If the new cyber threat intelligence 21A has been added to the cyber threat intelligence DB 21, the output unit 14 reads the added cyber threat intelligence 21A that has been added, and converts the added cyber threat intelligence 21A into the posted information 50, and performs output processing of storing the posted information 50 in the cyber threat intelligence DB 21.

Figure 9:
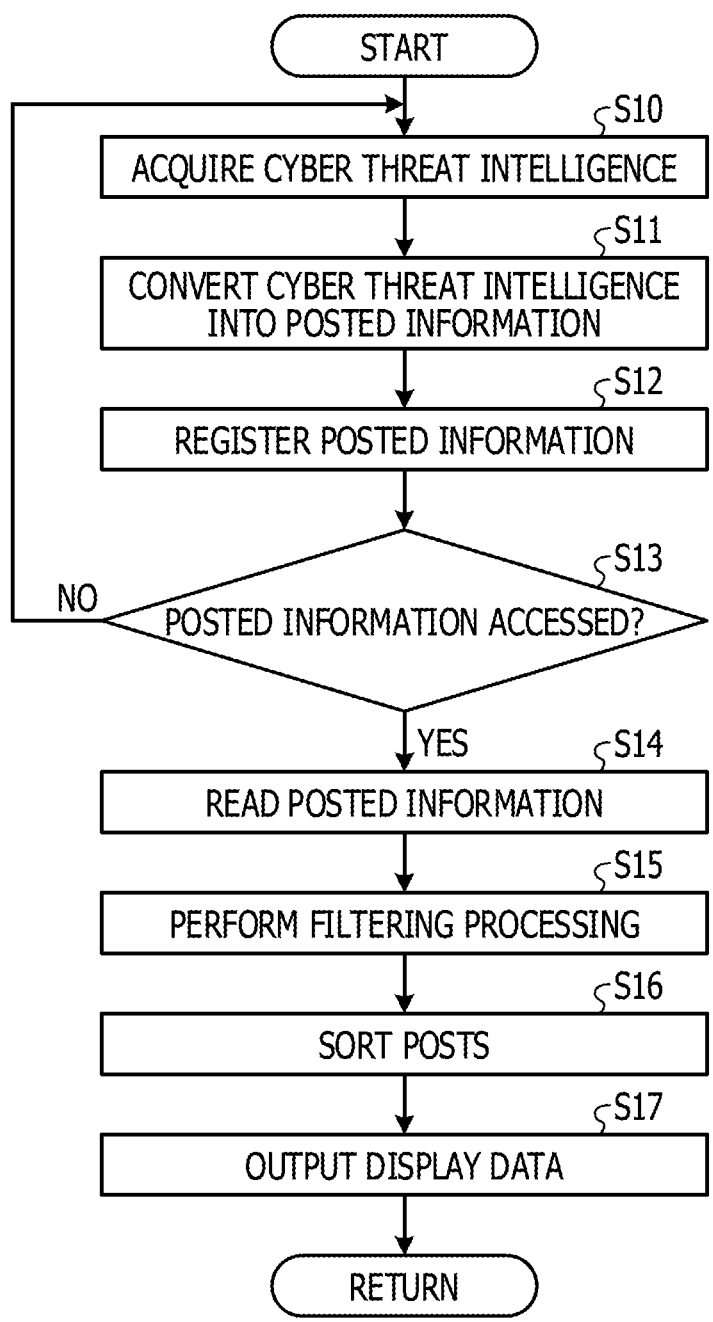
FIG. 9 is a flowchart illustrating an example of output processing of CTI.

FIG. 9 is a flowchart illustrating an example of output processing of CTI. As illustrated in FIG. 9, when the output processing starts, the output unit 14 references the cyber threat intelligence DB 21 and determines whether the cyber threat intelligence management system 3 has added new cyber threat intelligence 21A in the cyber threat intelligence DB 21. If the new cyber threat intelligence 21A has been added in the cyber threat intelligence DB 21, the output unit 14 acquires the added cyber threat intelligence 21A from the cyber threat intelligence DB 21 (S10).

The output unit 14 extracts each STIX element from the acquired cyber threat intelligence 21A, and coverts the cyber threat intelligence 21A into the posted information 50 in accordance with the extracted STIX element (S11).

For example, the output unit 14 converts each STIX element extracted from the cyber threat intelligence 21A into the posted information 50, based on an element easier to understand to humans. For example, the output unit 14 converts "STIX Header Title" in the cyber threat intelligence 21A into the title of the posted information 50. The output unit 14 also converts "STIX Header Description and/or Short Description" in the cyber threat intelligence 21A into the body of the posted information 50. The output unit 14 further converts a list or the like of indicators and observables in the cyber threat intelligence 21A into CSV files or the like, and allows the CSV files to be downloaded as the files to be attached to the posted information 50. The output unit 14 converts the cyber threat intelligence 21A with the access range thereof maintained the same into the posted information 50 as the item indicating the access range (item 43).

Then, the output unit 14 outputs the posted information 50 converted in S11 to the user terminal 10B (S12). The cyber threat intelligence 21A newly added in the cyber threat intelligence DB 21 is converted in a form that allows the user terminal 10B to gain access thereto in a way similar to the post from the user terminal 10A, and is then output. The cyber threat intelligence 21A newly added in the cyber threat intelligence DB 21 is also shared in the posting system 1.

The output unit 14 determines whether the posted information 50 has been accessed by the user terminal 10B (S13). If the posted information 50 has not been accessed by the user terminal 10B (S13: NO), processing returns to S10.

If the posted information 50 has been accessed by the user terminal 10B (S13: YES), the output unit 14 reads the posted information 50 from the cyber threat intelligence DB 21 (S14). For example, the output unit 14 reads corresponding information within the access range of the posted information 50 from the cyber threat intelligence DB 21 based on the user ID notified by the user terminal 10B.

The output unit 14 performs filtering processing of screening the read posted information 50 in accordance with a predetermined condition (S15). For example, the read posted information 50 may contain, as information related to the cyber attack, information useful to a user (human-based system) of the posting system 1 and substantially meaningless information as well. For example, the posted information 50 having a title and an indicator with no other information may be meaningful in the system-based system but not very much meaningful in the human-based system.

As an example of the filtering processing, a field of the posted information 50 matching the condition of a previously set white list may pass and a field of the posted information 50 not matching the condition of the black list may be blocked. As another example of the filtering processing, if an Internet protocol (IP) address in a field of the posted information 50 falls within a predetermined range, the field may pass, and if the IP address falls outside the predetermined range, the field may be blocked.

Based on the previously set screening condition, the output unit 14 screens the posted information 50 that is meaningful to the human-based system. If the posted information 50 having the same contents is posted in a larger amount per unit time, the output unit 14 may selectively compress the posted information 50 into a single piece of representing information.

The output unit 14 sorts the filtered posted information 50 in accordance with a time sequence order indicated by posting time and date, for example, re-arranges the posted information 50 in the time sequence order of direction from latest time to past time (S16). The output unit 14 then generates display data that lists the sorted posted information 50, and outputs the display data to the user terminal 10B (S17). The user terminal 10B thus verifies the list of the posted information 50 that contains the information into which the cyber threat intelligence 21A is converted.

Figure 10:
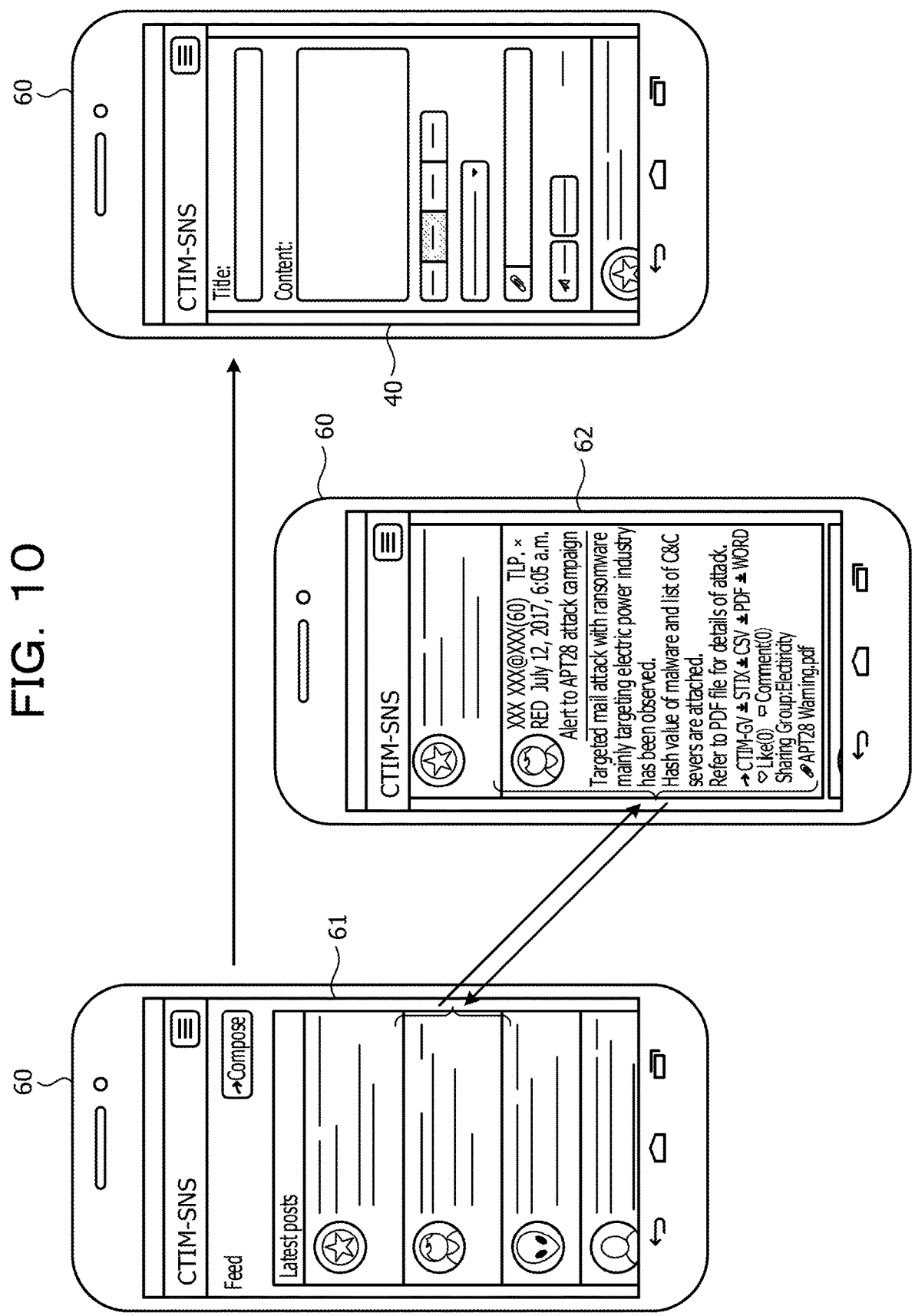
FIG. 10 is an explanatory view explaining a display example on a user terminal.

FIG. 10 is an explanatory view explaining a display example on a user terminal. A user terminal 60 of FIG. 10 is an example of the user terminal 10B that is of a smart phone type.

As illustrated in FIG. 10, the user terminal 60 displays a list display screen 61 that is based on the display data output by the output unit 14 in S17. The user of the user terminal 60 may thus verify a list of the posted information 50 that contains the information, into which the cyber threat intelligence 21A has been converted, and has been sorted in accordance with the time sequence order. The user of the user terminal 60 may post new information by performing a button operation on the list display screen 61 to call a post screen 40.

If a specific piece of the posted information 50 is selected from the list of the posted information 50 displayed on the list display screen 61, the user terminal 60 asks the output unit 14 in the posting system 1 about the contents of the selected posted information 50. For example, the user terminal 60 notifies the output unit 14 in the posting system 1 of the ID of the selected posted information 50.

Based on the ID notified by the user terminal 60, the output unit 14 references the cyber threat intelligence DB 21, and acquires information of each item in the selected posted information 50. The output unit 14 generates the display data indicating each item of the selected posted information 50, and outputs the display data to the user terminal 60. A post output screen 62 displaying each item of the selected posted information 50 is displayed on the user terminal 60.

Referring back to FIG. 1, the cyber threat intelligence management system 3 is described in detail. The cyber threat intelligence management system 3 includes an information source management DB 31, a cyber threat intelligence registration unit 32, a reliability update unit 33, and an output unit 34.

The information source management DB 31 is a database that manages information on an external site 4 basis, the external site 4 being an information source (acquisition source) of cyber threat intelligence 21A. For example, the information source management DB 31 stores identification information for identifying the external site 4 (for example, site address, site name, or site ID), and information related to the external site 4, such as reliability (information source reliability) previously set on the external site 4.

The cyber threat intelligence registration unit 32 registers in the cyber threat intelligence DB 21 the cyber threat intelligence 21A input by, for example, an analyst analyzing a cyber attack using a user terminal 30, or the cyber threat intelligence 21A provided from the external site 4 using TAXII or the like. At this time, the cyber threat intelligence registration unit 32 assigns reliability to the cyber threat intelligence 21A provided from the external site 4.

Figure 11:
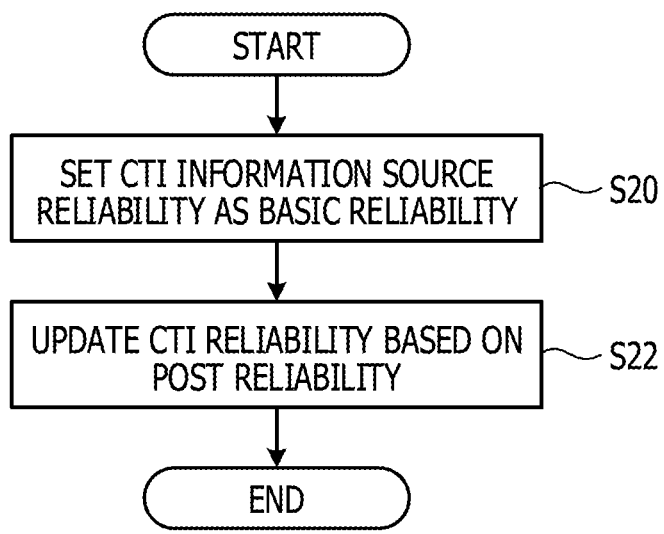
FIG. 11 is a flowchart illustrating processing of assigning reliability to CTI.

FIG. 11 is a flowchart illustrating processing of assigning reliability to CTI. For example, FIG. 11 illustrates processing of assigning reliability to new cyber threat intelligence 21A provided from the external site 4.

As illustrated in FIG. 11, when the processing is started, the cyber threat intelligence registration unit 32 references the information source management DB 31 for the cyber threat intelligence 21A provided from the external site 4, and sets information source reliability previously set on an information source that is an acquisition source to basic reliability of the cyber threat intelligence 21A (S20). Then, the cyber threat intelligence registration unit 32 references the cyber threat intelligence DB 21, and retrieves posted information related to the cyber threat intelligence 21A from among posted information (cyber threat intelligence) registered in the cyber threat intelligence DB 21 by the posting system 1.

For example, the cyber threat intelligence registration unit 32 compares syntax analysis results of posted information registered in the cyber threat intelligence DB 21 with syntax analysis results of the cyber threat intelligence 21A. The cyber threat intelligence registration unit 32 sets pieces of information having corresponding phenomena in the cyber attack event (such as cyber attack campaigns, threat actors, TTPs, indicators, observables, incidents, courses of action, and exploit targets) as pieces of information related to each other.

With the retrieval, if the cyber threat intelligence DB 21 has no registration of posted information related to the cyber threat intelligence 21A, the cyber threat intelligence registration unit 32 registers the set basic reliability as the reliability of the cyber threat intelligence 21A in the cyber threat intelligence DB 21.

With the retrieval, if registration of posted information related to the cyber threat intelligence 21A exists, the cyber threat intelligence registration unit 32 updates the reliability of the cyber threat intelligence 21A based on the reliability of the post (S22). For example, the cyber threat intelligence registration unit 32 updates the value of the set basic reliability based on the reliability assigned to the posted information (for example, (basic reliability) +(assigned reliability)). Then, the cyber threat intelligence registration unit 32 registers in the cyber threat intelligence DB 21 the updated reliability as the reliability of the cyber threat intelligence 21A.

For the cyber threat intelligence 21A input by an analyst or the like using a user terminal 30, the cyber threat intelligence registration unit 32 also registers in the cyber threat intelligence DB 21 the cyber threat intelligence 21A by directly assigning the reliability set by the analyst or the like at input.

When the reliability update unit 33 detects that the posted information corresponding to the cyber threat intelligence 21A is uploaded (registered) in the cyber threat intelligence DB 21 by the user terminal 10A or the like, the reliability update unit 33 updates the reliability assigned to the cyber threat intelligence 21A in accordance with the reliability of the posted information. The reliability update unit 33 also updates the reliability of the acquisition source (information source) of the cyber threat intelligence 21A set in the information source management DB 31, in accordance with the reliability of the posted information.

Figure 12:
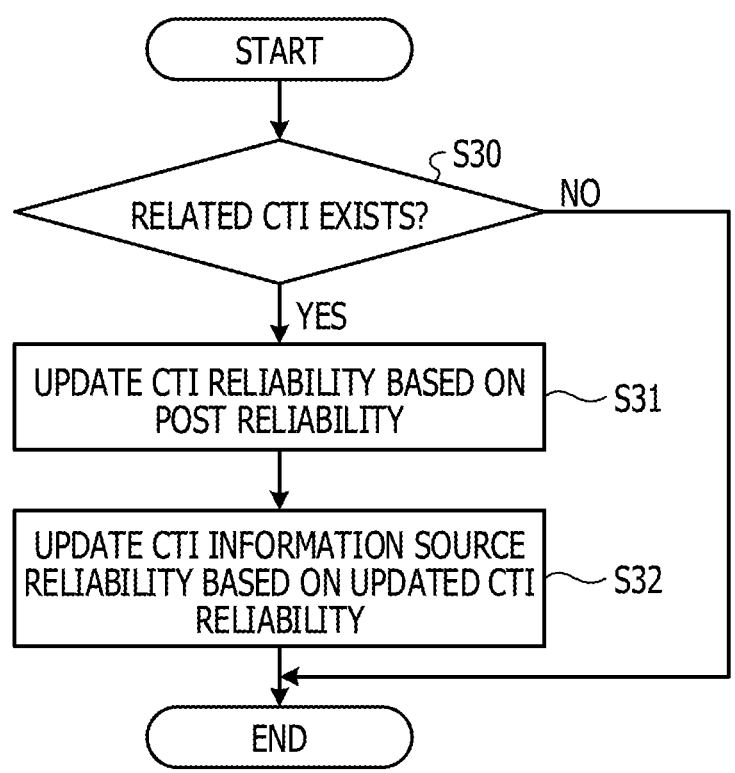
FIG. 12 is a flowchart illustrating processing of assigning reliability to CTI.

FIG. 12 is a flowchart illustrating processing of assigning reliability to CTI. For example, FIG. 12 is an illustration explaining processing of updating reliability by the reliability update unit 33 in accordance with a new post related to existing CTI.

For example, the reliability update unit 33 monitors posted information (cyber threat intelligence) that is newly registered in the cyber threat intelligence DB 21 by the posting system 1, and compares syntax analysis results of the newly registered posted information with syntax analysis results of the cyber threat intelligence 21A that has been registered in the cyber threat intelligence DB 21. The reliability update unit 33 sets pieces of information having corresponding phenomena in the cyber attack event (such as cyber attack campaigns, threat actors, TTPs, indicators, observables, incidents, courses of action, and exploit targets) as pieces of information related to each other, and detects upload of the corresponding posted information. For example, the reliability update unit 33 determines whether CTI (cyber threat intelligence 21A) related to a new post exists in the cyber threat intelligence DB 21 (S30).

If the upload of the corresponding posted information is detected, that is, if the cyber threat intelligence 21A corresponding to the posted information exists in the cyber threat intelligence DB 21 (S30: YES), the reliability update unit 33 updates the reliability of the cyber threat intelligence 21A in the cyber threat intelligence DB 21 based on the reliability of the posted information (S31). For example, the reliability update unit 33 adds the value of the reliability set in the posted information to the value of the reliability of the corresponding cyber threat intelligence 21A, and thus updates the reliability of the cyber threat intelligence 21A.

Similarly, the reliability update unit 33 adds the value of the reliability set in the posted information to the value of the information source reliability set in the information source management DB 31 for the acquisition source (information source) of the corresponding cyber threat intelligence 21A, and thus updates the information source reliability of the cyber threat intelligence 21A. For example, the reliability update unit 33 updates the information source reliability of the CTI set in the information source management DB 31 based on the updated CTI reliability (the reliability set in the posted information) (S32).

At this time, the reliability update unit 33 may change the weight to be added to the value of the information source reliability based on one or a combination of the number of nodes and the number of types of links, contained in the corresponding cyber threat intelligence 21A. For example, the reliability update unit 33 sets the weight to be fed back to be a larger value because context information is richer and more valuable as one or a combination of the number of nodes and the number of types of links are larger.

For example, the reliability update unit 33 obtains updated information source reliability (Rsnew) as Rsnew=RS+F*w, by using a value (F) of reliability set on the posted information, a feedback weight (w), and information source reliability (Rs). In this case, feedback weight w=(one or a combination of the number of nodes and the number of types of links contained in corresponding cyber threat intelligence 21A)/(the average of one or a combination of the number of nodes and the number of types of links contained in all posts). In case of a negative feedback, the reciprocal of w is used.

FIG. 13 is an explanatory view explaining a difference in weighting per CTI. As illustrated in FIG. 13, cyber threat intelligence 51F has only one type of nodes, "Indicators", and has no link other than links to "Indicators". In contrast, cyber threat intelligence 51G has four types of nodes and three types of links, has richer context information than that of the cyber threat intelligence 51F, and is more valuable as information. Thus, the reliability update unit 33 performs weighting in such a way that the information source reliability of the cyber threat intelligence 51G with higher value likely increases and less likely decreases. The reliability update unit 33 also performs weighting in such a way that the information source reliability of the cyber threat intelligence 51F with lower value less likely increases and likely decreases.

FIG. 14 is an explanatory view explaining assignment of reliability to CTI and information source. As illustrated in FIG. 14, regarding CTI of "Campaign A", the information source reliability is "10", and the posted information corresponding to the CTI is the post P1 (see FIG. 8). Thus, the reliability after correction by posting of the CTI of "Campaign A" is 10+13=23. The information source reliability (after update) is $10+13w_A$. Note that $w_A$ is a weight value corresponding to one or a combination of the number of nodes and the number of types of links of the CTI of "Campaign A".

Regarding CTI of "Campaign B", the information source reliability is "20", and the posted information corresponding to the CTI is the post P3 (see FIG. 8). Thus, the reliability after correction by posting of the CTI of "Campaign B" is 20−15=5. The information source reliability (after update) is $20-15w_i$. Note that $w_i$ is a weight value corresponding to one or a combination of the number of nodes and the number of types of links of the CTI of "Campaign B".

Regarding CTI of "Campaign C", the information source reliability is "30", and there is no posted information corresponding to the CTI. Thus, in the CTI of "Campaign C", the reliability after correction by posting and information source reliability (after update) remain 30 unchanged.

Figure 15:
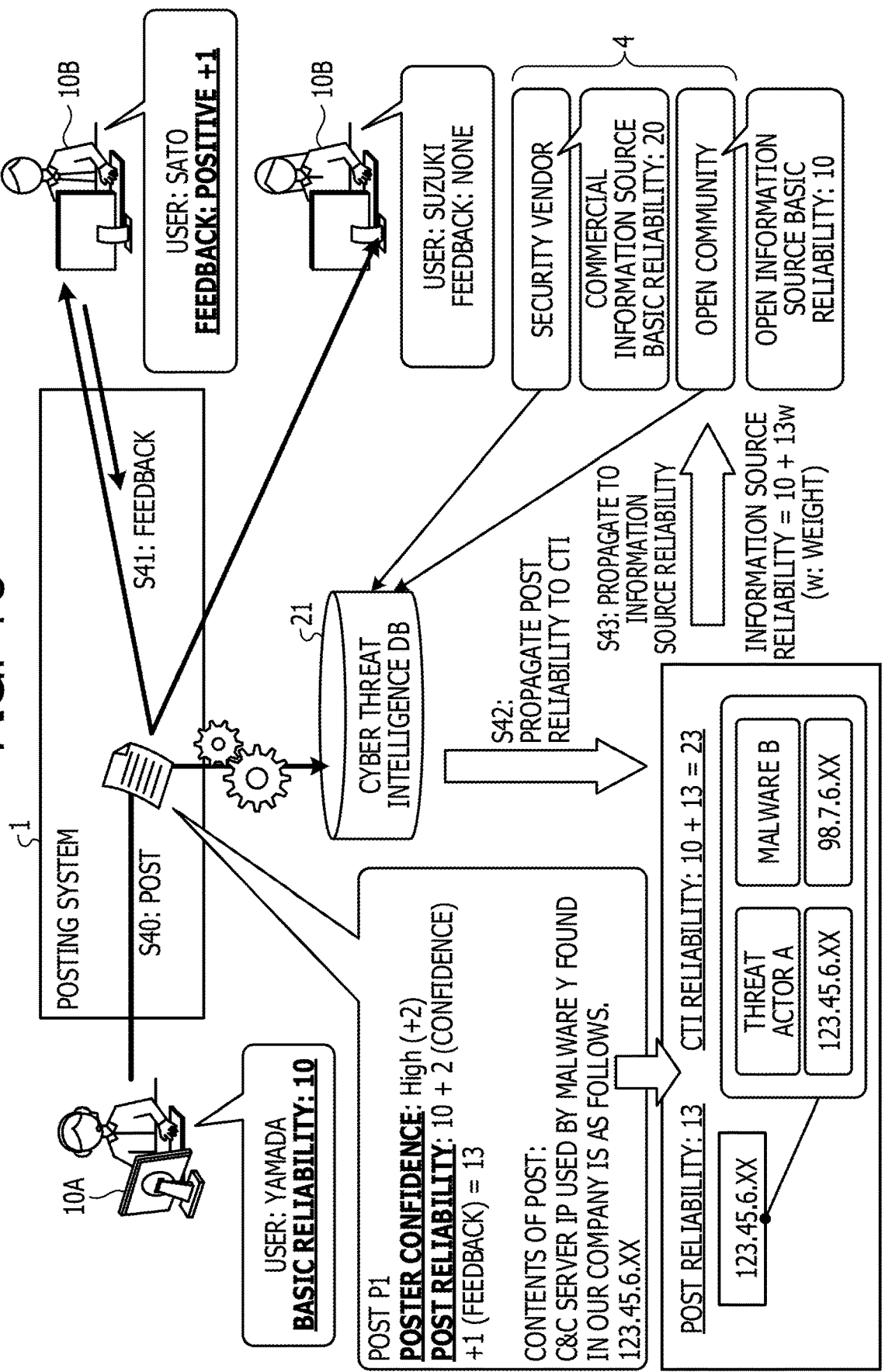
FIG. 15 is an explanatory view explaining propagation of reliability by posting.

FIG. 15 is an explanatory view explaining propagation of reliability by posting. As illustrated in FIG. 15, a user "Yamada" with basic reliability of "10" makes a post P1 (confidence "High (+2)") from the user terminal 10A (S40). In response to the posting, a user "Sato" makes a positive feedback (+1) from the user terminal 10B (S41). Reliability of 10+2+1=13 is assigned to such a post P1.

When the reliability update unit 33 updates the reliability, the reliability "13" of the post P1 propagates to related CTI (S42). For example, "13" is added to the reliability "10" of the related CTI, and the reliability is updated to "23". With the reliability update unit 33, the reliability "13" of the post P1 also propagates to the information source reliability of the information source of the related CTI (S43). For example, the information source reliability "10" in "open community" that is the information source of the related CTI is updated by using the reliability "13" of the post P1 as 10+13w. In this way, the reliability of the post P1 (evaluation of the post) propagates to the reliability of the CTI and the information source reliability of the CTI. Thus, evaluation on the post related to the CTI may be made as evaluation on the reliability of the CTI, and the CTI may be analyzed with increased efficiency at high level.

In response to an access from the user terminal 30 (such as a user ID identifying a user and a reference request of the cyber threat intelligence 21A), the output unit 34 reads the cyber threat intelligence 21A registered in the cyber threat intelligence DB 21, and outputs the cyber threat intelligence 21A to the user terminal 30. For example, in response to the access from the user terminal 30, the output unit 34 reads cyber threat intelligence 21A falling within the access range from the cyber threat intelligence DB 21 based on the user ID or the like notified by the user terminal 30. Then, the output unit 34 further generates display data that indicates the cyber threat intelligence 21A read from the cyber threat intelligence DB 21, and outputs the display data to the user terminal 30. Thus, the cyber threat intelligence 21A falling within the access range of the user of the user terminal 30 is displayed on the user terminal 30.

In accordance with the syntax analysis results of the cyber threat intelligence 21A to be displayed, the output unit 34 sets the cyber attack campaign, threat actor, TTP, indicator, observable, incident, course of action, and exploit target in the cyber attack event to be representative nodes, and analyzes the tree structure having information in each node as child nodes. Based on the analysis results of the tree structure, the output unit 34 then generates display information representing the display screen 35 in the form of a graph in which the nodes are linked in accordance with the tree structure, and outputs the display information to the user terminal 30. Thus, the display screen 35 in the form of a graph is displayed on the user terminal 30.

Figure 16:
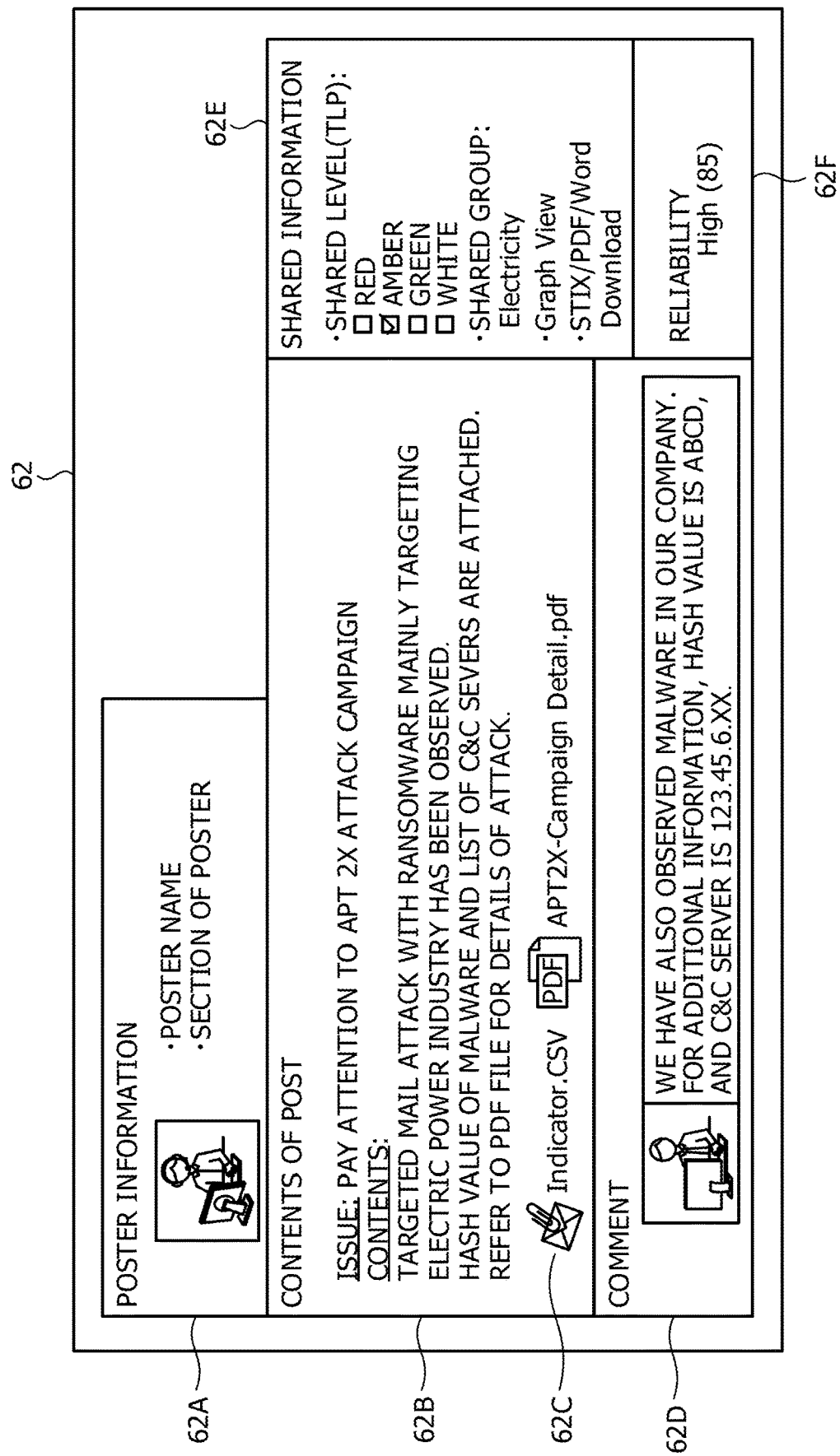
FIG. 16 is an explanatory view explaining an example of an output screen of CTI.

FIG. 16 is an explanatory view explaining an example of an output screen of CTI. As illustrated in FIG. 16, items 62A through 62F are displayed as the contents of the items of selected posted information 50 on a post output screen 62. The item 62A displays poster information of the posted information 50. The item 62B displays posted contents of the posted information 50. The item 62C displays a file attached to the posted information 50. The item 62D displays a comment related to the posted information 50. The item 62E displays shared information indicating the access range of the posted information 50. The item 62F displays reliability. With the post output screen 62, the user may easily recognize the details of the posted information 50 containing the information converted from the cyber threat intelligence 21A.

Figure 17:
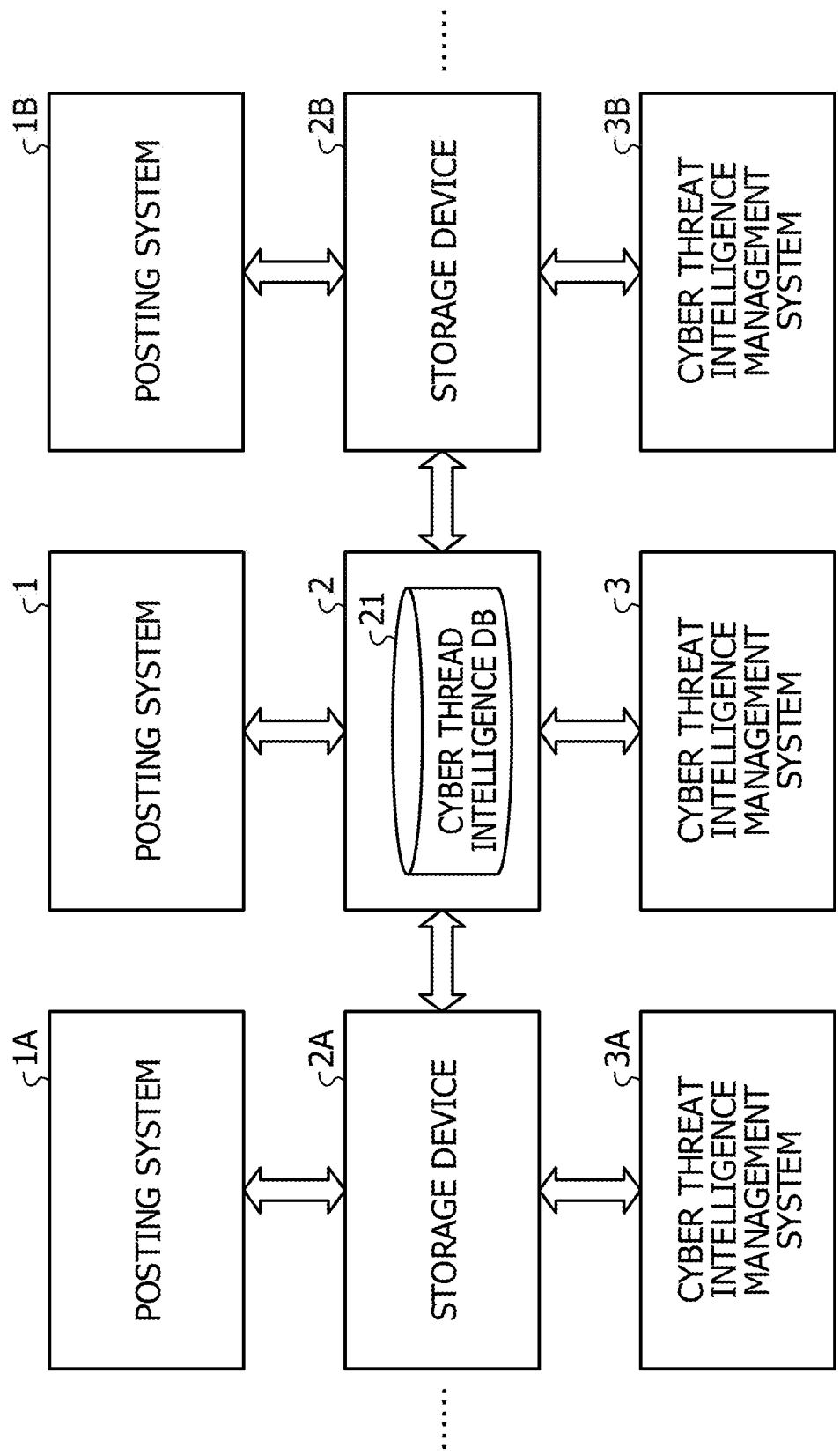
FIG. 17 is an explanatory view explaining an example of a distributed system configuration.

FIG. 17 is an explanatory view explaining an example of a distributed system configuration. As illustrated in FIG. 17, a security operation center (SOC) includes the posting system 1, the storage device 2, and the cyber threat intelligence management system 3. The SOC may be geographically and politically distributed. In addition to the SOC that includes the posting system 1, the storage device 2, and the cyber threat intelligence management system 3, an SOC including a posting system 1A, a storage device 2A, and a cyber threat intelligence management system 3A, and an SOC including a posting system 1B, a storage device 2B, and a cyber threat intelligence management system 3B are distributed.

From among the SOCs, information stored in the cyber threat intelligence DB 21 is transferred (shared) by using a communication protocol to transfer information on a cyber attack, such as TAXII, between one of the storage device 2 and the cyber threat intelligence management system 3 in the central SOC and one of the storage device 2A and the cyber threat intelligence management system 3A in another SOC. In this way, the posting system 1 of the human-based system of the SOC and the cyber threat intelligence management system 3 of the system-based system share the cyber threat intelligence 21A. Another SOC which is geographically or politically distributed may share the cyber threat intelligence 21A.

As described above, when acquiring information related to a cyber attack (cyber threat intelligence 21A), the cyber threat intelligence registration unit 32 of the cyber threat intelligence management system 3 references the information source management DB 31, and stores the CTI in the cyber threat intelligence DB 21 in association with the reliability based on the acquisition source of the CTI. When the reliability update unit 33 of the cyber threat intelligence management system 3 detects that the posted information corresponding to the CTI is uploaded in the cyber threat intelligence DB 21 by the user terminal 10A via the posting system 1, the reliability update unit 33 updates the reliability associated with the CTI in accordance with the reliability of the posted information.

Thus, the cyber threat intelligence management system 3 may reflect the reliability of the posted information on the reliability of the CTI. For example, the cyber threat intelligence management system 3 updates the reliability of the CTI based on one or a combination of the reliability set on the poster as the post source of the posted information, the confidence assigned by the poster, and the feedback made by another poster on the posted information. Thus, one or a combination of the reliability set on the poster of the posted information, the confidence assigned by the poster, and the feedback made by another poster on the posted information may be reflected on the reliability of the CTI. In this way, by reflecting the reliability of the posted information on the reliability of the CTI, the CTI may be analyzed with increased efficiency at high level.

The reliability update unit 33 updates the reliability of the information source management DB 31 of the acquisition source (information source) of the information on the cyber attack corresponding to the posted information, in accordance with the reliability of the posted information. Thus, the cyber threat intelligence management system 3 may reflect the reliability of the posted information on the reliability of the acquisition source of the CTI. For example, the reliability set by the poster of the posted information, the confidence assigned by the poster, and the feedback made by another poster on the posted information may be reflected on the reliability of the information source of the CTI.

The reliability update unit 33 updates the reliability of the acquisition source of the CTI based on one or a combination of the number of nodes and the number of types of links contained in the CTI. Thus, for example, the reliability of the information source of CTI with a large number of nodes and a large number of types of links (CTI more valuable as analysis target) may be likely increased (or unlikely decreased). The reliability of the information source of CTI with a small number of nodes and a small number of types of links (CTI less valuable as analysis target) may be likely decreased (or unlikely increased).

The elements of each of the apparatuses described above may not necessarily have to be physically constructed exactly as illustrated. Actual configurations of the distribution and integration of the apparatuses are not limited to the configuration illustrated, and some or all of the configurations may be distributed or integrated according to any functionality unit or any physical unit depending on a variety of workloads and usage status.

Some or all of the processing and functionalities performed by the posting system 1 and the cyber threat intelligence management system 3 may be performed on a CPU (or a microcomputer, such as a microprocessor unit (MPU) or a micro controller unit (MCU)). Some or all of the processing and functionalities may be performed on a program that is executed for analysis by the CPU (or a microcomputer, such as MPU or MCU) or wired-logic hardware. The processing and functionalities that are performed by the posting system 1 and the cyber threat intelligence management system 3 may be performed by cloud computing in which multiple computers operate in cooperation with each other.

Figure 18:
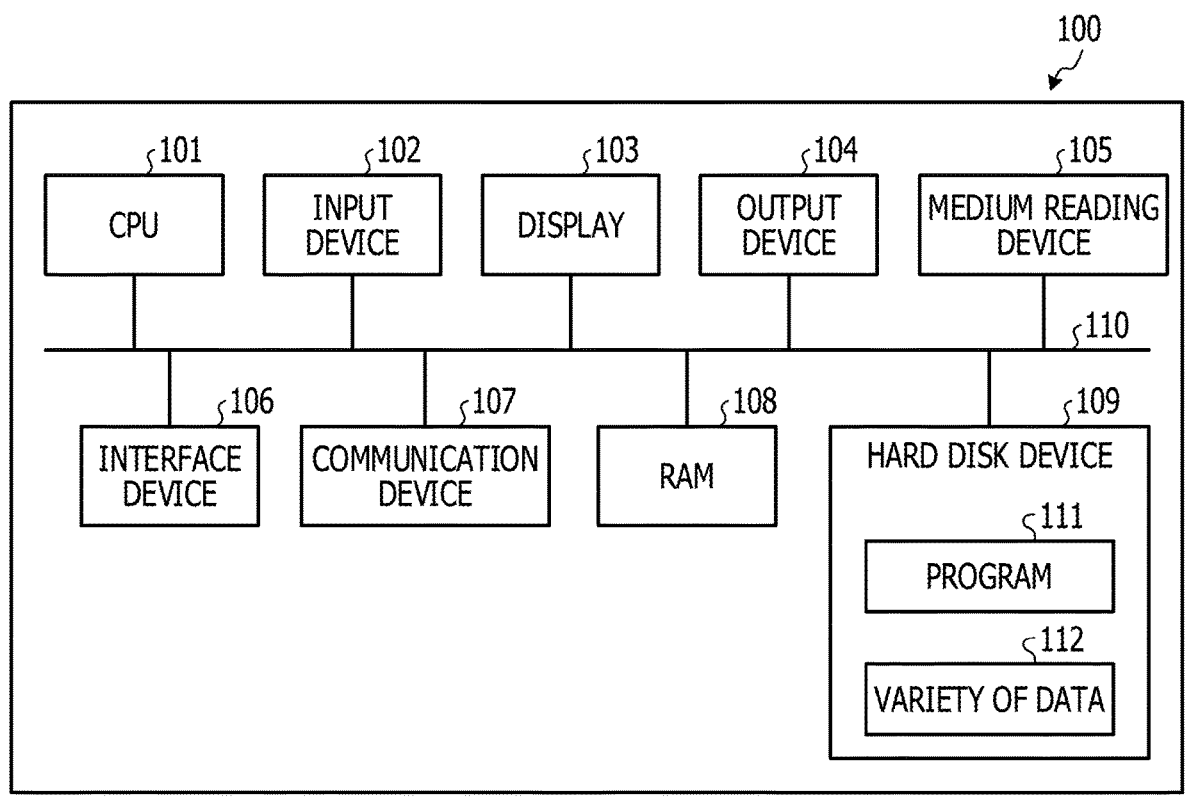
FIG. 18 is a block diagram illustrating an example of a hardware configuration of an information processing apparatus according to the embodiment.

The processing described with reference to the embodiment may be implemented by causing a computer to execute a plurality of instructions included in a program prepared in advance. An example of a computer (hardware) that executes the program having the same functionalities as those of the above-described embodiment is described below. FIG. 18 is a block diagram illustrating a hardware configuration of an information processing apparatus 100 of the embodiment.

As illustrated in FIG. 18, the information processing apparatus 100 includes a CPU 101 that performs a variety of arithmetic operations, an input device 102 that receives input data, a display 103, and an output device 104 that outputs a sound. The information processing apparatus 100 also includes a medium reading device 105 that reads a program and the like from a storage medium, an interface device 106 that connects to a variety of devices, and a communication device 107 that is wiredly or wirelessly connected to an external device for communication. The information processing apparatus 100 also includes a random-access memory (RAM) 108 that temporarily stores a variety of information, and a hard disk device 109. The elements (the CPU 101 through the hard disk device 109) in the information processing apparatus 100 are connected to a bus 110.

The hard disk device 109 stores a plurality of instructions included in a program 111 that performs a variety of processing of the post receiving unit 11, the registration unit 12, the output unit 14, the cyber threat intelligence registration unit 32, the reliability update unit 33, the output unit 34, and the like. The hard disk device 109 stores a variety of data 112 (such as the user management DB 13, or the information source management DB 31) to be referenced by the program 111. The input device 102 receives operation information input from an operator of the information processing apparatus 100. The display 103 displays a variety of screens to be operated by the user. The interface device 106 is connected to a printer or the like. The communication device 107 is connected to a communication network, such as a LAN, and exchanges a variety of information with an external device via the communication network.

The CPU 101 reads the program 111 stored in the hard disk device 109, and expands the program 111 in the RAM 108, thereby performing a variety of processing related to the post receiving unit 11, the registration unit 12, and the output unit 14 of the posting system 1. The CPU 101 performs various processing related to the cyber threat intelligence registration unit 32, the reliability update unit 33, and the output unit 34 by executing the plurality of instructions included in the program 111 in the cyber threat intelligence management system 3. The program 111 may not necessarily be stored in the hard disk device 109. For example, the posting system 1 may read the program 111 from a readable storage medium, and may execute the program 111. The storage media that are readable by the information processing apparatus 100 may include a portable recording medium, such as a compact disk read-only memory (CD-ROM), a digital versatile disk (DVD), or a universal serial bus (USB), a semiconductor memory, such as a flash memory, and a hard disk drive. The program 111 may be stored in a device connected to a public communication line, the Internet, or a local-area network (LAN), and the information processing apparatus 100 may read the program 111 from the device and execute the program 111.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A social networking service analysis apparatus comprising:
   one or more memories; and
   one or more processors coupled to the one or more memories and the one or more processors configured to:
   when acquiring, among information posted by a plurality of users in a social networking service (SNS), information regarding a first cyber attack, store the information in the one or more memories in association with reliability based on an acquisition source of the information, and
   when detecting that posted information related to the information is uploaded from a terminal to the SNS, perform update of the reliability associated with the information in accordance with first reliability of the posted information.

2. The social networking service analysis apparatus according to claim 1, wherein
   the first reliability is calculated by using at least one of second reliability associated with a post source of the posted information and evaluation information indicating evaluation of the posted information, the evaluation being received from a terminal other than the post source.

3. The social networking service analysis apparatus according to claim 1, wherein
   the update includes updating reliability of the acquisition source in accordance with the first reliability.

4. The social networking service analysis apparatus according to claim 1, wherein
   the processor is configured to: update reliability of the acquisition source on the basis of at least one of a number of nodes and a number of types of links included in the information.

5. The social networking service analysis apparatus according to claim 1, wherein
   the information is generated by changing a data format of other posted information uploaded from the terminal.

6. The social networking service analysis apparatus according to claim 5, wherein
   the information is data in a Structured Threat Information eXpression format, and the other posted information is information posted in a social network service.

7. A computer-implemented social networking service analysis method comprising:
   when acquiring, among information posted by a plurality of users in a social networking service (SNS), information regarding a first cyber attack, storing the information in a memory in association with reliability based on an acquisition source of the information; and
   when detecting that posted information related to the information is uploaded from a terminal to the SNS, updating the reliability associated with the information in accordance with first reliability of the posted information.

8. The social networking service analysis method according to claim 7, wherein
   the first reliability is calculated by using at least one of second reliability associated with a post source of the posted information and evaluation information indicating evaluation of the posted information, the evaluation being received from a terminal other than the post source.

9. The social networking service analysis method according to claim 7, wherein
   the updating includes updating reliability of the acquisition source in accordance with the first reliability.

10. The social networking service analysis method according to claim 7, further comprising:
    updating reliability of the acquisition source on the basis of at least one of a number of nodes and a number of types of links included in the information.

11. The social networking service analysis method according to claim 7, wherein the information is generated by changing a data format of other posted information uploaded from the terminal.

12. The social networking service analysis method according to claim 11, wherein
the information is data in a Structured Threat Information eXpression format, and the other posted information is information posted in a social network service.

13. A non-transitory computer-readable medium storing instructions executable by one or more computers, the instructions comprising:
one or more instructions for, when acquiring, among information posted by a plurality of users in a social networking service (SNS), information regarding a first cyber attack, storing the information in a memory in association with reliability based on an acquisition source of the information; and
one or more instructions for, when detecting that posted information related to the information is uploaded from a terminal to the SNS, updating the reliability associated with the information in accordance with first reliability of the posted information.

* * * * *